(12) United States Patent
Nussbaum et al.

(10) Patent No.: US 6,459,404 B1
(45) Date of Patent: Oct. 1, 2002

(54) DDS SPUR MITIGATION IN A HIGH PERFORMANCE RADAR EXCITER

(75) Inventors: Howard S. Nussbaum, Los Angeles; William P. Posey, Palos Verdes Estates, both of CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/649,729

(22) Filed: Aug. 28, 2000

(51) Int. Cl.$^7$ .......................... H03B 21/00; G01S 7/282
(52) U.S. Cl. ........................ 342/202; 327/106
(58) Field of Search ................ 342/202, 203; 327/105, 106, 107

(56) References Cited

U.S. PATENT DOCUMENTS

| | | |
|---|---|---|
| 5,650,738 A | 7/1997 | Taylor et al. ............... 327/237 |
| 5,652,534 A | 7/1997 | Taylor et al. ............... 327/237 |
| 5,673,051 A | 9/1997 | Nussbaum et al. ......... 342/202 |
| 5,878,335 A * | 3/1999 | Kushner ...................... 455/260 |
| 6,064,241 A * | 5/2000 | Bainton et al. ............. 327/107 |
| 6,081,226 A | 6/2000 | Caldwell et al. ............ 342/200 |

OTHER PUBLICATIONS

Kochemasov et al., "Narrow–Band Direct Digital Synthesizers," 1995 IEEE International Frequency Control SYmposium, pp. 236–249.*

Reinhardt, V., "Spur Reduction Techniques in Direct Digital Synthesizers," 1993 IEEE Inetnational Frequency Control Symposium, pp. 230–241.*

Galani et al., "An Overview of Frequency Synthesizers for Radars", IEEE Transactions on Microwave Theory and Techniques, vol. 39, No. 5, May 1991.*

A Digital Frequency Synthesizer,Joseph Tierney et al., IEEE Transactions on Audio and Electroacoustics,Col. AU–19, No. 1, pp. 48–57, Mar. 1971.

A High Purity, High Speed Direct Digital Synthesizer,Gary W. Kent et al., IEEE International Frequency Control Symposium, pp. 207–211, 1993.

* cited by examiner

Primary Examiner—Ian J. Lobo
(74) Attorney, Agent, or Firm—Leonard A. Alkov; Glenn H. Lenzen, Jr.

(57) ABSTRACT

A technique is described for providing a pulsed radar exciter signal, in a radar exciter including a direct digital synthesizer (DDS). The DDS is reset pulse-to-pulse to provide a pulsed DDS signal having pulse-to-pulse phase discontinuities due to the resetting of the DDS. The phase of the pulsed DDS signal can be shifted pulse-to-pulse by a phase shift that is held constant over a pulse to correct the pulse-to-pulse phasing of the DDS signal. A discrete phase modulator can provide the phase shift. The phase of the pulsed DDS signal can be shifted pulse-to-pulse by an additional phase shift which is a linear phase sequence from pulse-to-pulse, or by an additional phase shift which is a quadratic phase sequence from pulse-to-pulse to produce a ranging waveform.

14 Claims, 4 Drawing Sheets

DDS SPUR MITIGATION IN A HIGH PERFORMANCE RADAR EXCITER

TECHNICAL FIELD OF THE INVENTION

This invention relates to digital synthesizers, and more particularly to techniques for mitigating spur generation in such synthesizers for applications in radar.

BACKGROUND OF THE INVENTION

Direct Digital Synthesizers (DDS) are known in the art, and are described, for example, in "A Digital Frequency Synthesizer," Joseph Tierney et al, IEEE Transactions on Audio and Electroacoustics, Col. AU-19, No. 1, pages 48–57, March 1971; and "A High Purity, et al, IEEE International Frequency Control Symposium, pages 207–211, 1993.

The current generation of DDSs provides the flexibility to generate both fine frequency selection and the pulse compression modulation for a radar exciter. However, the DDS can not provide the spectral purity required for high performance radars.

Prior attempts to clean up the spectrum of the DDS used for channel selection have used filters and frequency dividers. If only fine frequency is needed, a narrowband variable center frequency filter can be used to filter the signal from the DDS to produce a spectrally pure signal. Unfortunately, the narrowband filter will severely degrade the pulse compression modulation which has a bandwidth wider than the narrowband filter. Also, frequency dividers reduce the DDS signal bandwidth by a corresponding amount and thus, reduce its usefulness in a wideband application. Thus, the fidelity of the current generation of DDSs are not adequate to meet the requirements of high performance radars when used in a conventional manner in the radar exciter.

SUMMARY OF THE INVENTION

An aspect of the invention is to control a DDS so as to repeat the same sequence/waveform pulse-to-pulse, and to compensate the resulting transmit waveform for the phase discontinuity due to the DDS repeating the sequence. In this way, the important elements of the spectrum needed for radar operation are not degraded by the less than perfect DDS.

Thus, in accordance with one aspect of the invention, a method is described for providing a pulsed radar exciter signal, in a radar exciter including a direct digital synthesizer (DDS). The method includes resetting the DDS pulse-to-pulse to provide a pulsed DDS signal having pulse-to-pulse phase discontinuities due to the resetting of the DDS.

In accordance with a further aspect of the invention, the method can include shifting the phase of the pulsed DDS signal pulse-to-pulse by a phase shift that is held constant over a pulse to correct the pulse-to-pulse phasing of the DDS signal.

In accordance with another aspect of the invention, a pulsed radar exciter is described, which includes a direct digital synthesizer (DDS) for generating a pulsed DDS signal. A controller resets the DDS for each pulse to restart operation. A discrete phase modulator generates a phase shift signal that is held constant over a pulse to correct the pulse-to-pulse phasing of the DDS signal. A mixer combines the DDS signal and the phase shift signal to produce a composite signal which is corrected to provide a high purity signal. Some applications may not require the correction of the phase shift pulse-to-pulse and will not require the use of a discrete phase modulator.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENTS

In accordance with an aspect of the invention, a radar exciter configuration is described which uses a conventional DDS with its restricted performance, together with a pulse-to-pulse phase correction technique, which achieves a level of spectral purity required for many radar applications.

For radar applications where the signal is pulsed, spectral purity has a different meaning than for a CW signal. The radar waveform is not spectrally pure. The waveform has spectral lines and distortions at multiples of the PRF away from the primary frequency. Furthermore, the radar processing forms range samples and examines the spectral content of the signal processed from the same range sample pulse-to-pulse. Examination of the spectral content at this point greatly reduces the requirement on spectral purity in the conventional sense.

The typical method of generating a waveform starts with a spectrally pure CW waveform and gates the signal and impresses a pulse compression modulation on it. Alternatively, these operations can conceptually be reversed, and a DDS used to generate the pulse compression modulation including fine frequency. However, the DDS modulation repeats pulse-to-pulse which corrupts the spectrum in the conventional sense. This corruption is from the pulse-to-pulse phase not being consistent with a CW signal at the center frequency.

In accordance with an aspect of the invention, a device, such as the discrete phase modulator described in U.S. Pat. No. 5,673,051, the entire contents of which are incorporated herein by this reference, corrects the distortion by generating a pure signal with phase corrections which when mixed with the DDS output, corrects the pulse-to-pulse phasing due to the resetting of the DDS. The signal from the phase modulator only has to correct the transmit waveform, and uses the time period between pulses for the discrete phase modulator to settle any transients.

Figure 1:
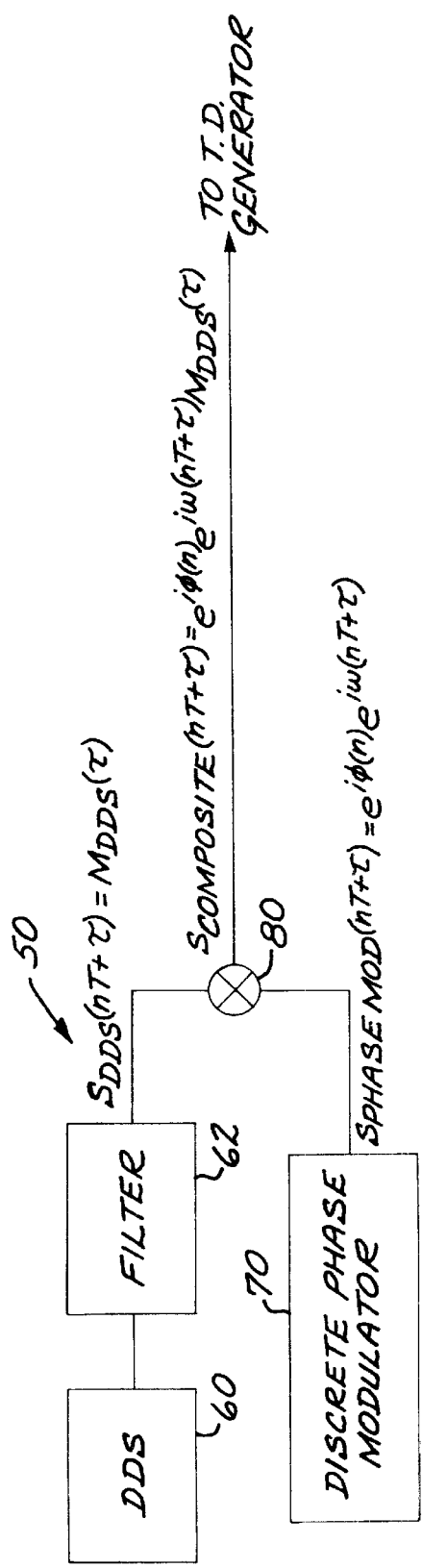
FIG. 1 is a block diagram illustrating DDS spur mitigation in accordance with aspects of this invention.
Figure 5:
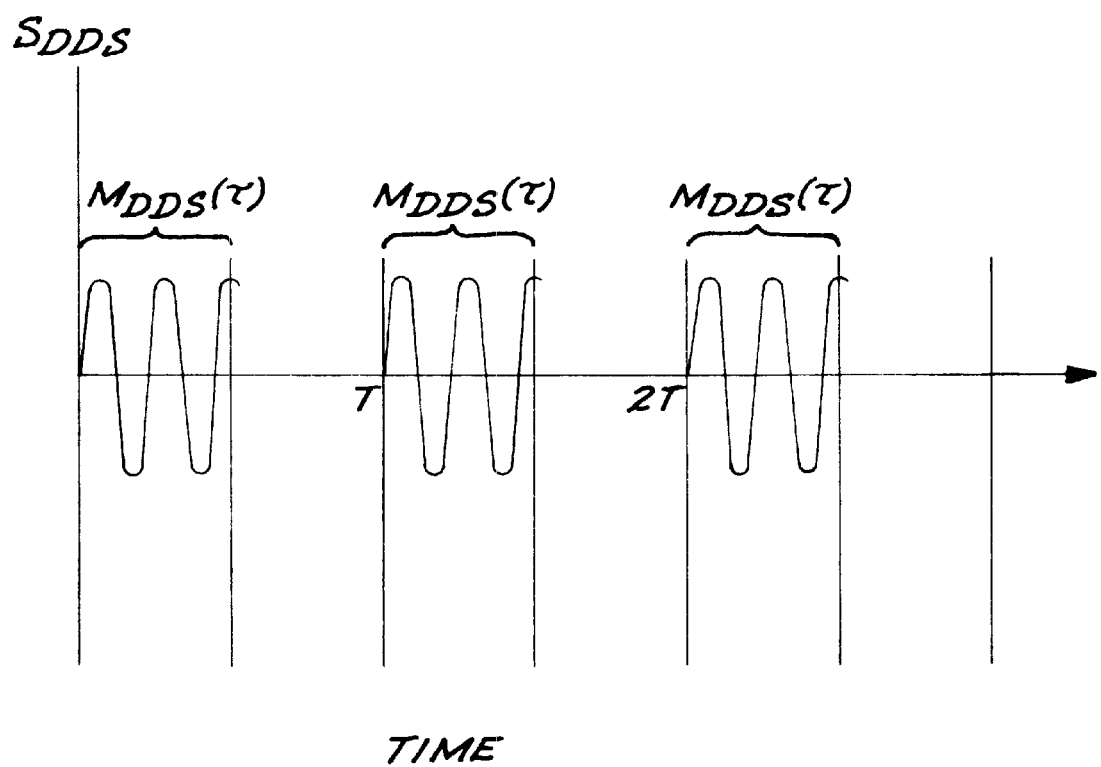
FIG. 5 illustrates an exemplary DDS waveform.

A block diagram illustrating DDS spur mitigation in accordance with aspects of this invention is shown in FIG. 1. This system 50 includes a DDS 60, whose output signal is passed through filter 62 to provide a filtered DDS signal $S_{DDS}(NT+\tau)=M_{DDS}(\tau)$, where T is the Radar Pulse Repetition Interval (PRI), n is the Pulse number, and $\tau$ is the time within a PRI. $M_{DDS}$ is the filtered modulation signal from the DDS 60 that repeats pulse-to-pulse. The quantity $S_{DDS}$ is the modulation of the underlying pulse stream. $S_{DDS}$ repeats at an interval T and the modulation during this interval is given by $M_{DDS}$. This modulation might include, but is not limited to, a sine wave for fine frequency selection and a phase code for pulse compression. For the case of fine frequency selection, $M_{DDS}(\tau)=\exp(i\omega_{DDS}\tau)$, where $\omega_{DDS}$ is the fine frequency. FIG. 5 illustrates an exemplary $S_{DDS}$ waveform.

The system 50 also includes a discrete phase modulator 70. An exemplary discrete phase modulator system suitable for the purpose is described in U.S. Pat. No. 5,673,051. The discrete phase modulator 70 produces a signal $S_{PhaseMod}(nT+\tau)=e^{i\phi(n)}e^{i\omega(nT+\tau)}$, where $\phi(n)$ is the phase correction from the phase modulator that is held constant over a pulse, and $\omega$ is the center frequency of interest. For this application, $\phi(n)$ is a linear phase sequence given by $\phi(n)=n\omega_{DDS}T$.

The filtered DDS signal and the phase modulator signal are mixed together at mixer function 80, to provide the composite signal $S_{Composite}(nT+\tau)=(\exp(i\phi(n))\exp(i\omega(nT+\tau)M_{DDS}(\tau))$. The filtered DDS signal also can be provided to a mixer for use in generating a local oscillator signal, as will be described below.

Both the DDS and the discrete phase modulator are well suited to their roles in an exemplary implementation. The DDS typically includes a digital-to-analog converter (DAC), and is very good at accurately reproducing the same waveform pulse-to-pulse by resetting the initial phase of the DDS to the same value at the start of each pulse. The DDS generates an internal numerical sequence as a result of its operation that is input to the DAC. In this way, the internal sequence of the DDS, which drives the DDS DAC, repeats pulse-to-pulse, since the resetting causes the arithmetic operations to repeat. This will result in any errors introduced by the DAC to also be reproduced every pulse.

The discrete phase modulator provides a very accurate technique of generating pulse-to-pulse phase modulations. Furthermore, the pulse-to-pulse phase correction can include an additional phase sequence, which can be used to frequency offset the radar return (linear phase sequence) and produce a ranging waveform (quadratic phase sequence). This additional phase modifies $\phi(n)$ to a different linearly increasing sequence or a quadratically increasing sequence. The use of these phase sequences is described in U.S. Pat. No. 5,673,051, at column 4, lines 26–55, and FIGS. 4–5.

Figure 3:
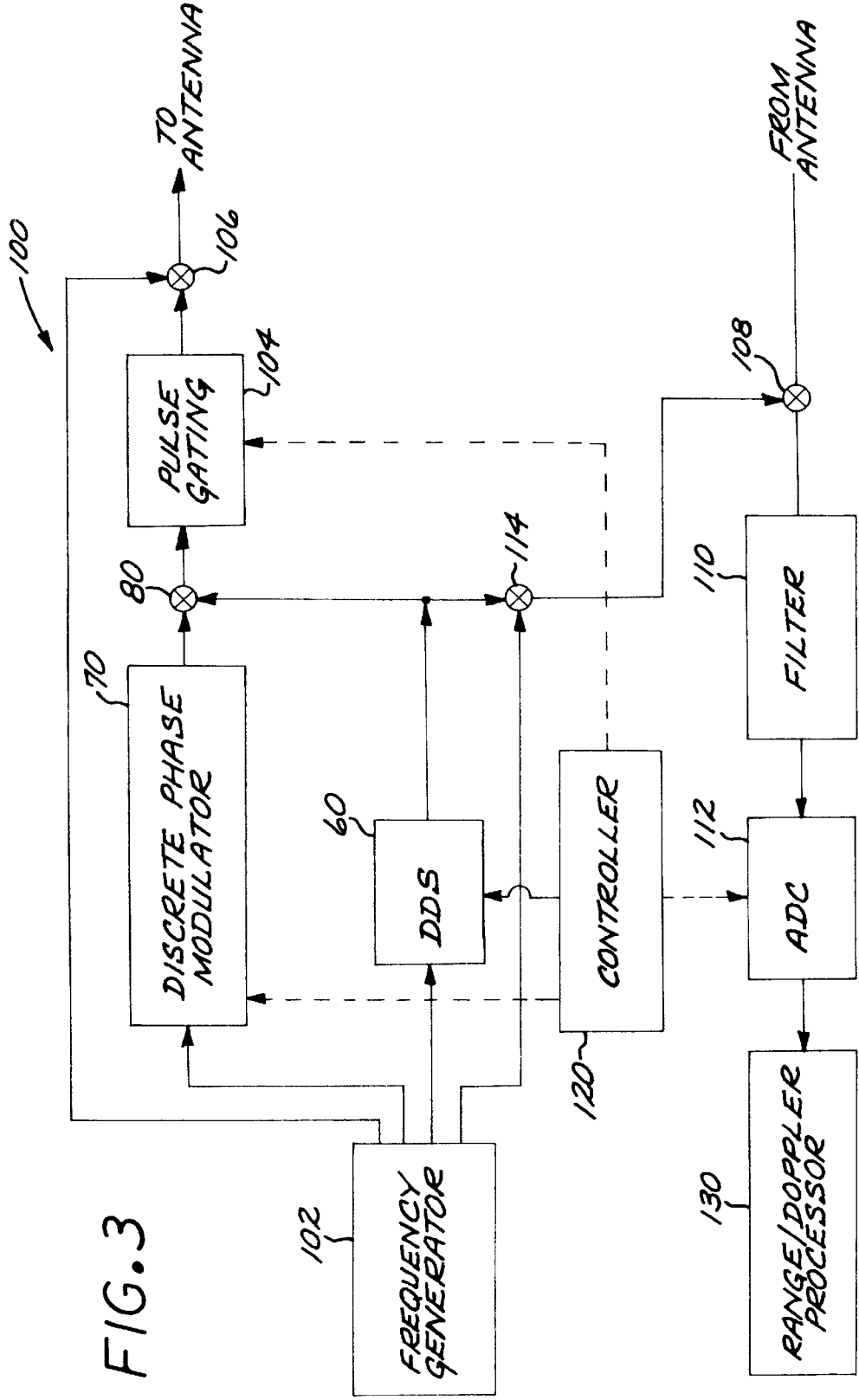
FIG. 3 is a schematic block diagram of an exemplary radar system employing the invention.

An exemplary radar system 100 employing the invention is shown in FIG. 3. The radar system employs a frequency generator 102 to generate all the constant frequency signals to be supplied throughout the radar system. The DDS 60, discrete phase modulator 70 and mixer 80 generate the signals as discussed above regarding FIG. 1. The output of mixer 80 is provided to a pulse gating circuit 104 which gates the RF signal and produces pulses. The output of the pulse gating circuit 104 is mixed at mixer 106 with a constant frequency signal to upconvert the signal to the transmit frequency to generate a pulsed radar transmit signal, which is sent to the radar system antenna.

The DDS output signal is also mixed with a constant frequency signal from the frequency generator 102 at mixer 114 to generate a local oscillator signal which is mixed at mixer 108 with the receive signals from the antenna. The downconverted signals are filtered by filter 110, and the filtered signals are converted to digital form by analog-to-digital converter (ADC) 112. A Range/Doppler processor 130 performs range/doppler processing of the digitized signals in a conventional manner.

The system 100 includes a controller 120 which issues commands and control signals to the discrete phase modulator 70, the DDS 60, the pulse gating circuit 104 and the ADC 112. Thus, the controller 120 controls the DDS to reset the DDS for each pulse. For the DDS, the controller provides the resetting time strobe each pulse and other commands needed by the DDS to control the fine frequency and the pulse compression waveform. For the phase modulator, the controller provides the phase correction sequence and a time strobe that establishes the start and duration of each phase. The controller also controls the pulse gating, establishing the position and duration of each pulse. The controller also decides which outputs of the ADC are sent to the processor.

Figure 2:
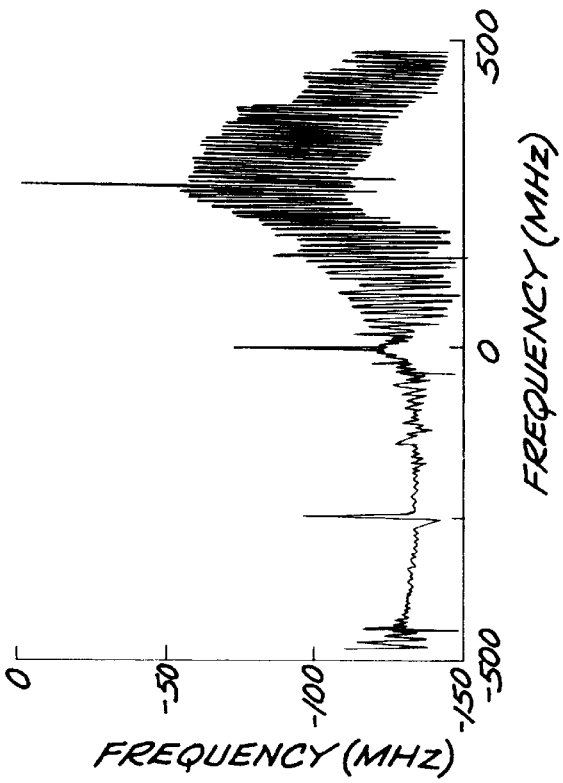
FIG. 2 illustrates a typical DDS spectrum, where the lines in the spectrum are due to typical imperfections in the DDS.
Figure 4A:
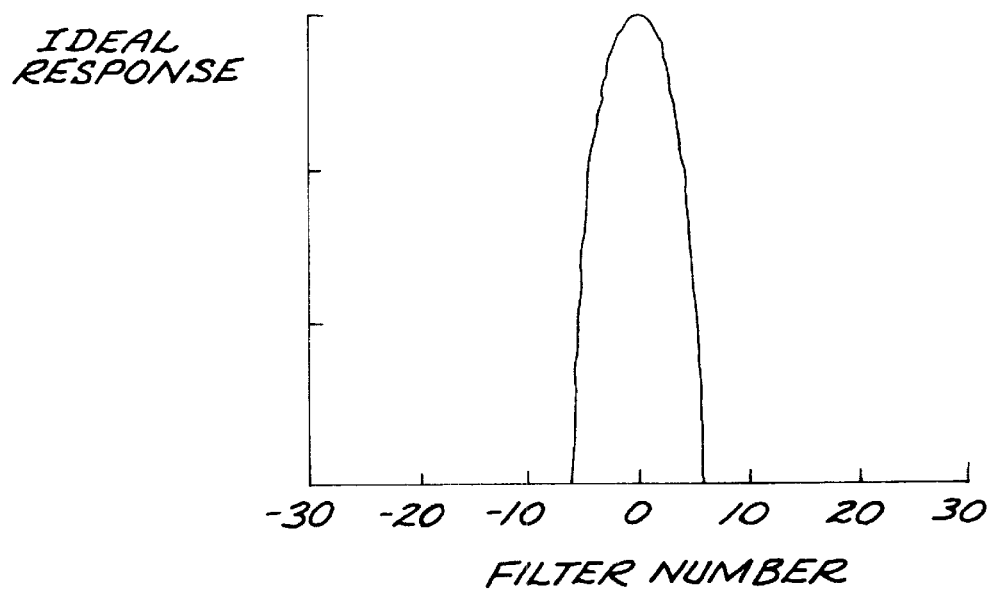
FIGS. 4A and 4B are respective Doppler filter responses which compares the ideal Doppler filter response (FIG. 4A) and the distorted Doppler filter response (FIG. 4B) in accordance with an aspect of the invention.
Figure 4B:
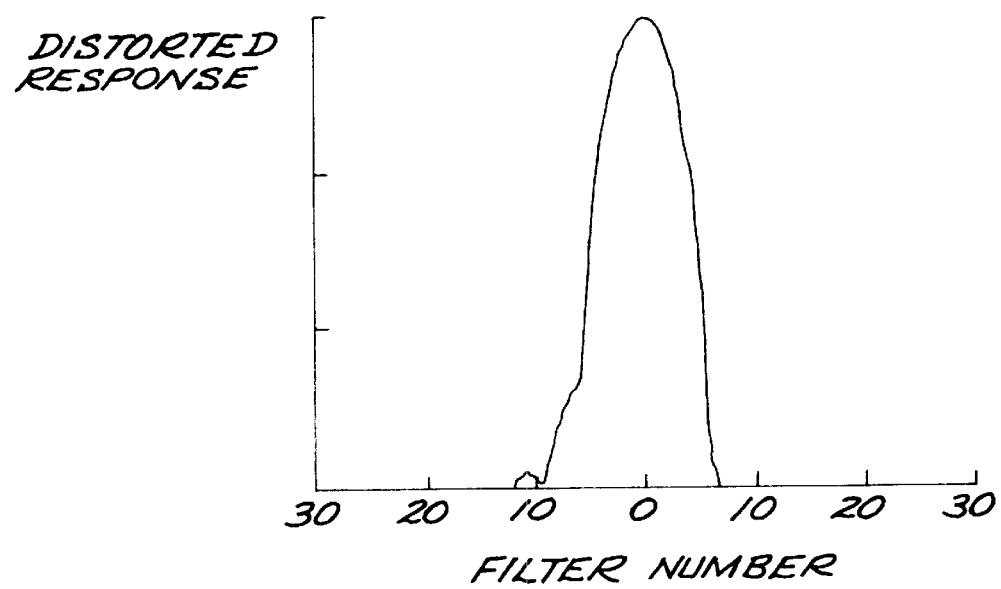

To illustrate the operation of the radar system 100 with the DDS, consider a DDS whose spectrum is shown in FIG. 2 where the lines in the spectrum are due to typical imperfections in the DDS. Using a DDS of this quality in a conventional manner in a radar exciter causes lines in the Doppler spectrum of the radar resulting in false target declarations or degraded sensitivity. However, restarting the DDS pulse-to-pulse and using the discrete phase modulator in accordance with the invention will produce a radar spectrum that is free of spurs, but the primary line is slightly wider. This is illustrated in FIGS. 4A and 4B, which compare the ideal Doppler filter response (FIG. 4A) to the distorted Doppler filter response (FIG. 4B). This increased width is a function of the relative velocity between the radar and a scatterer that produces the return. As the velocity increases, the width increases in a known manner. For situations when the relative velocity is not excessively high, such as found in airborne radar applications, the degradation does not effect performance.

The effect illustrated in FIGS. 4A and 4B is due to the phenomenon that repeating the DDS sequence, and hence the DDS distortions, causes the distorted spectrum of FIG. 2 to be rescaled in frequency due to scatterer motion. For target or clutter returns, the rescaling of the spectrum of FIG. 2 changes the axis from Megahertz to tens of hertz, and FIG. 4B is the result of convolving the scaled DDS distorted spectrum with the doppler filter response.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for providing a pulsed radar exciter signal, in a radar exciter including a direct digital synthesizer (DDS), the method including:
   resetting the DDS pulse-to-pulse to provide a pulsed DDS signal having pulse-to-pulse phase discontinuities due to the resetting of the DDS.

2. The method of claim 1, further including:
   shifting the phase of the pulsed DDS signal pulse-to-pulse by a phase shift that is held constant over a pulse to correct the pulse-to-pulse phasing of the DDS signal.

3. A method for providing a pulsed radar exciter signal, in a radar exciter including a direct digital synthesizer (DDS), the method including:
   resetting the DDS pulse-to-pulse to provide a pulsed DDS signal having pulse-to-pulse phase discontinuities due to the resetting of the DDS; and
   shifting the phase of the pulsed DDS signal pulse-to-pulse by a phase shift that is held constant over a pulse to correct the pulse-to-pulse phasing of the DDS signal.

4. The method of claim 3, wherein the step of shifting the phase of the pulsed DDS signal pulse-to-pulse includes shifting said phase by a phase sequence φ(n) which is a linear phase sequence.

5. The method of claim 3 wherein the step of shifting the phase of the pulsed DDS signal pulse-to-pulse includes shifting said phase by an additional phase shift which is a linear phase sequence from pulse-to-pulse.

6. The method of claim 3 wherein the step of shifting the phase of the pulsed DDS signal pulse-to-pulse includes shifting said phase by an additional phase shift which is a quadratic phase sequence from pulse-to-pulse to produce a ranging waveform.

7. A pulsed radar exciter, including:
- a direct digital synthesizer (DDS) for generating a pulsed DDS signal;
- a controller for resetting the DDS for each pulse to restart operation for each pulse;
- a discrete phase modulator for generating a phase shift signal that is held constant over a pulse to correct the pulse-to-pulse phasing of the DDS signal; and
- a mixer for combining the DDS signal and the phase shift signal to produce a composite signal which is corrected to provide a high purity signal.

8. The radar exciter of claim 7, wherein the discrete phase modulator is adapted to generate an additional phase shift which is a linear phase sequence from pulse-to-pulse.

9. The radar exciter of claim 7, wherein the discrete phase modulator is adapted to generate an additional phase shift which is a quadratic phase sequence from pulse-to-pulse to produce a ranging waveform.

10. A radar system, comprising:
- a frequency generator for generating constant frequency signals used in the radar system;
- a direct frequency synthesizer (DDS) coupled to the frequency generator for generating a pulsed DDS signal;
- a controller for resetting the DDS for each pulse to restart operation for each pulse, wherein the pulsed DDS signal has pulse-to-pulse phase discontinuities due to the resetting of the DDS;
- a discrete phase modulator for generating a phase shift signal that is held constant over a pulse to correct the pulse-to-pulse phasing of the DDS signal;
- a mixer for combining the DDS signal and the phase shift signal to produce a composite signal which is corrected to provide a high purity signal.

11. The system of claim 10, further comprising a pulse gating circuit coupled to the output of said mixer, whose output is mixed at a second mixer with a constant frequency signal to generate a pulsed radar transmit signal, which is sent to a radar system antenna.

12. The system of claim 11, further comprising a third mixer and a fourth mixer, and wherein the DDS output signal is also mixed at said third mixer with a constant frequency signal from the frequency generator to generate a local oscillator signal, and said local oscillator signal is mixed at the fourth mixer with receive signals from the antenna to provide downconverted receive signals.

13. The system of claim 12, further comprising a range/Doppler processor, and a filter coupled to an analog-to-digital converter (ADC), and wherein the downconverted receive signals are filtered by said filter, the filtered signals are converted to digital form by said ADC, and said Range/Doppler processor processes the digitized signals.

14. The system of claim 10, wherein said phase shift signal includes a linear phase sequence pulse-to-pulse.

* * * * *